March 5, 1957
C. R. TEMP
2,784,027
DRAWER UNIT FOR PICK-UP TRUCKS
Filed Jan. 31, 1955
2 Sheets-Sheet 1
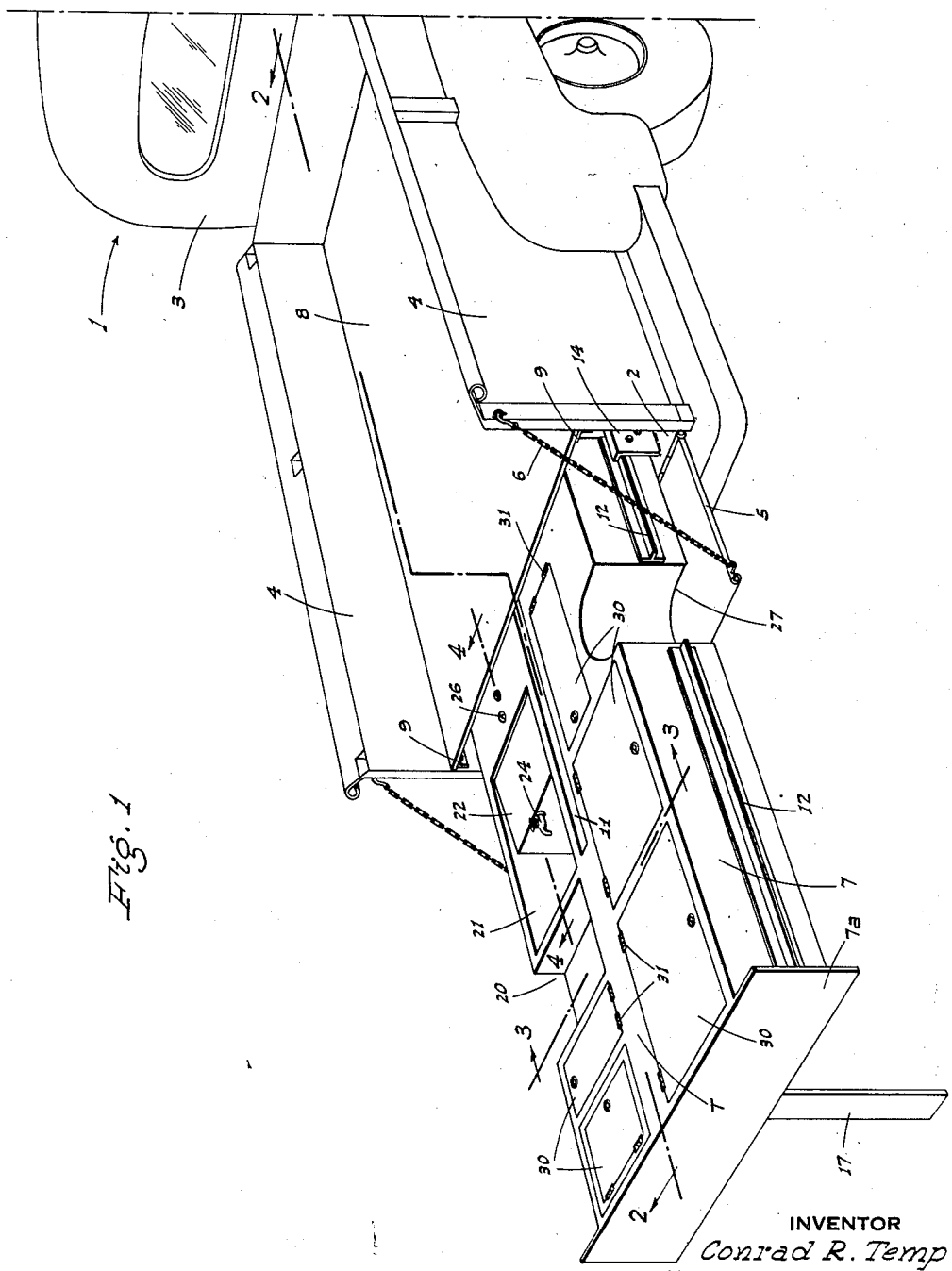
INVENTOR
Conrad R. Temp
BY Webster & Webster
ATT'YS.

March 5, 1957 C. R. TEMP 2,784,027
DRAWER UNIT FOR PICK-UP TRUCKS
Filed Jan. 31, 1955 2 Sheets-Sheet 2
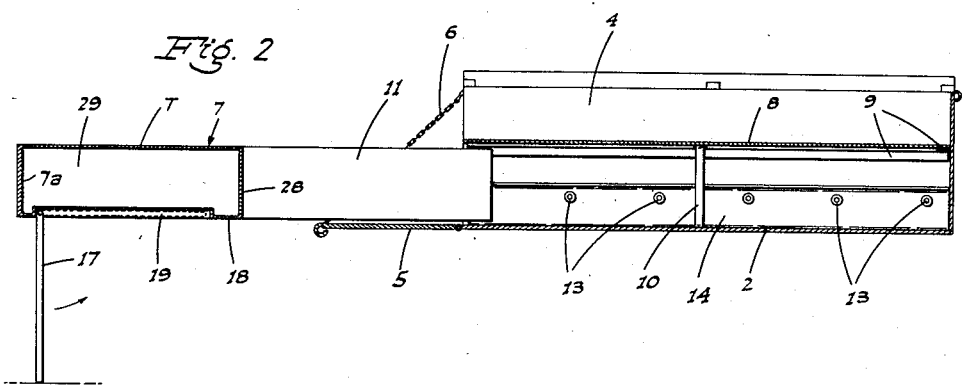
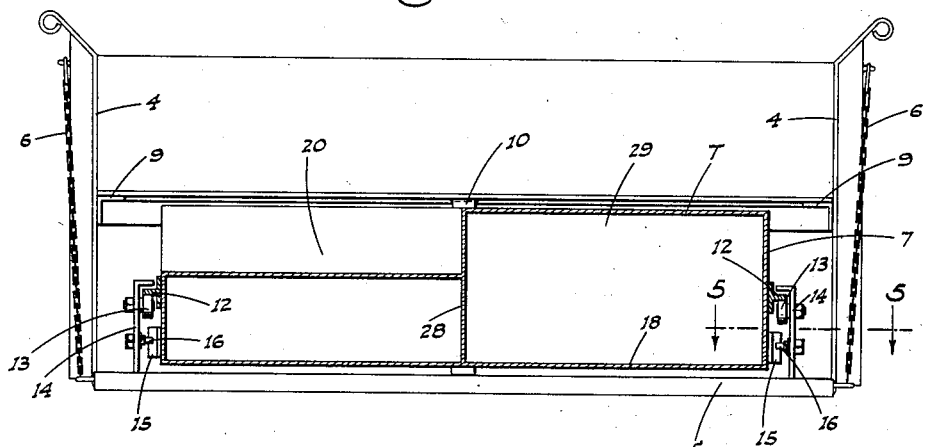
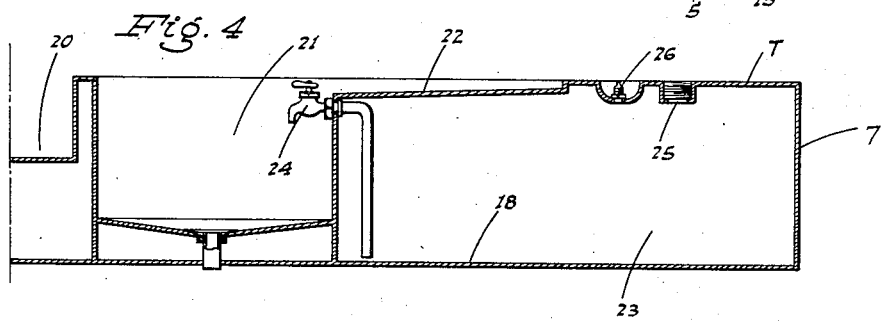
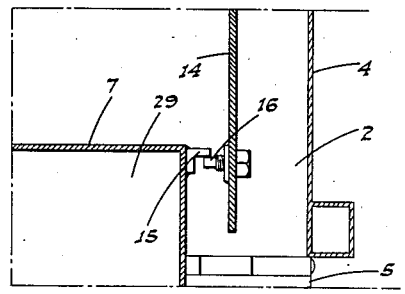
INVENTOR
Conrad R. Temp
BY Webster & Webster
ATTYS.

United States Patent Office 2,784,027
Patented Mar. 5, 1957

2,784,027

DRAWER UNIT FOR PICK-UP TRUCKS

Conrad R. Temp, Sacramento, Calif.

Application January 31, 1955, Serial No. 485,213

3 Claims. (Cl. 296—23)

This invention relates to that type of vehicle commonly known as a pick-up truck, and which includes—behind the driver's cab of the vehicle—a flat load carrying bed, upstanding but relatively shallow side walls, and a hinged, downwardly swingable tailgate for the rear end of the bed, limited in its downward movement to a horizontal position.

The major purpose of my invention is to equip the load -carrying portion of such a vehicle with a false load-carrying floor above the bed, and with a large drawer, fitting between the bed and such false floor, arranged as a relatively complete kitchen and commissary unit, and mounted on said portion of the truck in such a manner that the unit may be readily pulled out for use when the rear end tailgate is lowered, or fully retracted into said portion to then allow of closing of the tailgate.

A further object of the invention is to arrange the drawer so that when pulled out it may serve as a table for eating, or other purposes.

To be properly effective for its intended purpose, the drawer is made nearly as long as the bed of the truck, and another object of the invention is to mount the drawer so that it may be pulled out practically its entire length while still being connected to the truck, and to provide a means whereby when so pulled out the drawer may be supported at its rear end from the ground.

Also, for purposes of efficiency, the drawer is nearly as wide as the bed of the truck between the upstanding side walls thereof, and another object of the invention is to form the drawer on one side so that when fully extended or pulled out, ample foot room on the tailgate is left for a person to stand on the tailgate and conveniently reach the load on, or to step into, the floor of the truck.

A pick-up truck when so equipped is thus admirably adapted for use by utility-company service men who, in the performance of their line-installing, repair, or other duties, must travel out into the country, as well as by hunters, fishermen, campers, and the like in the pursuit of their avocation; and such persons, using a truck so equipped, are able to prepare and partake of a hot meal— with hot or cold drinks, as the case may be—in a convenient and comfortable manner.

Also, the table may be used for other purposes than eating from if so desired.

Still another object of the invention is to provide a practical and reliable drawer unit for pick-up trucks, and one which will be exceedingly effective for the purposes for which it is designed.

These objects are accomplished by means of such structure and relative arrangement of parts as will fully appear by a perusal of the following specification and claims.

In the drawings:

Fig. 1 is a fragmentary perspective outline of a conventional pick-up truck equipped with my improved kitchen and table drawer unit; the drawer being shown extended and in operative position.

Fig. 2 is a longitudinal section on line 2—2 of Fig. 1.

Fig. 3 is a transverse section on line 3—3 of Fig. 1.

Fig. 4 is a fragmentary enlarged longitudinal section of the drawer on line 4—4 of Fig. 1.

Fig. 5 is a fragmentary sectional plan on line 5—5 of Fig. 3.

Referring now more particularly to the drawings, and to the characters of reference marked thereon, a truck 1 to which my invention is applied includes a flat bed 2 extending rearwardly from the cab 3 of the truck, sides 4 upstanding from the bed, and a hinged tailgate 5 to cooperate when raised in closing relation with the sides and hung from side chains 6 or the like which limit downward swinging of the tailgate to a horizontal position, as shown in Fig. 1.

The kitchen and table forming drawer 7 is of rectangular form, somewhat narrower than the width between the sides 4, as shown in Fig. 3, but practically the same length as the bed 2 and materially shallower in height than the sides 4. The rear endwall 7a of the drawer however, while flush with the top and bottom thereof, is of sufficient width to fit closely between the sides 4 when the drawer is fully retracted onto the bed from the extended operative position of said drawer.

When the drawer is so retracted, the tailgate 5 may be raised to a closed position in the usual manner.

In order that a load may be carried in the truck without such load resting on the drawer, a false floor 8 extends between the sides 4 for the full length thereof, being supported on flange members 9 secured to the sides 4 and extending across the front at a level such that the false floor is held just clear of the drawer. A supporting upright 10 depends from the floor 8 to bed 2 intermediate the ends of said floor and substantially centrally of the width thereof; the drawer having a vertical slot 11 to straddle the upright. This slot is open at the forward end and from top to bottom of the drawer, and extends rearwardly a sufficient distance to enable the drawer to be fully closed.

The drawer is supported from the bed 2 for easy sliding movement by means of rails 12 extending along the sides of the drawer and engaging rollers 13 mounted on longitudinal supports 14 secured on and upstanding from the bed 2.

In order to limit the outward movement of the drawer, while enabling the same to be removed when necessary, suitable means is provided, which is here shown as being lugs 15 secured on the sides of the drawer 7 adjacent the forward end thereof and engaging retractible stops 16 secured on the adjacent supports 14. (See Figs. 3 and 5.)

When the drawer is pulled out until the stops 16 engage the lugs, said drawer will then tend to tilt down slightly so that it rests on the tailgate. In order to support the drawer when so pulled out, without said drawer resting on the tailgate, a hinged leg 17 is mounted on the bottom 18 of the drawer adjacent its rear end for ground engagement when swung to a dependent position; said leg being arranged to be swung upwardly in a forward direction to a folded position and to be then received in a recess 19 formed in said bottom.

The drawer is formed with a flat top T, and on one side, and intermediate its ends, said drawer is formed with a rectangular recess 20 in said top and open to said side thereof and of a size sufficient to receive a conventional portable cook-stove unit of the type commonly used by campers and the like.

Ahead of the depression, the drawer 7 is formed with a sink 21 and a drain board 22 ahead of, and leading to, the sink.

The area in the drawer under the drain board between the sink and the forward end of the drawer, and between the slot 11 to the adjacent side of the drawer, may provide a reservoir 23 for a supply of water for the faucet 24 which overhangs the sink. Water is fed into the reservoir through a normally plugged intake opening 25, and the water may be retained under pressure in the reservoir by air pumped into the same through a valved fitting 26 of the type used on tires; said fitting being countersunk in the top of the drawer, as shown in Fig. 4.

On the side opposite the sink, the drawer is formed with a vertical, substantially semi-circular recess 27, extending from top to bottom of the drawer and positioned so that when the drawer is pulled out to its operative position said recess is over the tailgate toward the rear end thereof, as shown in Fig. 1. The size of this recess is sufficient so that a person standing on the tailgate may have an adequate foothold thereon, so as to enable such person to reach and handle any element of a load carried on the false floor 8, or to conveniently step onto said floor. Without the recess it would be impossible for a person to stand on the few inches of the tailgate which are exposed when the drawer is pulled out. The adjacent rail 12 is of course cut away so that it does not cross the recess 27, as shown in Fig. 1.

The remaining area of the drawer is divided by suitable partitions, such as shown at 28, into a number of separate compartments or bins, such as are shown at 29 in Figs. 2 and 3, and which are all closed by separate hinged lids 30 set into the top 7 of the drawer so as to be flush therewith, as are the hinges 31 of such lids as well as the knobs or lifting elements thereof, as shown in Fig. 1.

These bins are arranged to receive pots and pans, cutlery, groceries, and the like, such as may be needed for an outing or trip away from a source of supplies. The two compartments at the rear end of the drawer are designed to contain an ice box and groceries, respectively, so that the drawer need be pulled out a short distance only when it is necessary to renew the ice supply and replenish the stock of groceries.

By reason of the fact that the top surface of the drawer is flush or smooth throughout, it may be conveniently used as a table for eating and other purposes when said drawers are pulled out or extended.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In combination in a pick-up truck which includes a bed having upstanding sides, a false floor over the bed in spaced relation thereto and supported from said sides, a commissary drawer substantially the size of the bed and of a height to fit between the bed and false floor, means mounting the drawer in connection with the bed for fore and aft sliding movement relative to the bed whereby said drawer may be selectively disposed in a retracted position on the bed or a rearwardly extended and exposed position relative thereto, a flat top on the drawer throughout its extent on one side and across the rear portion to provide a continuous table, compartments in the drawer open to the top thereof, and lids on the compartments flush with said top and having depressed lid-manipulating elements.

2. In combination in a pick-up truck which includes a bed having upstanding sides, and a tailgate at the rear end of the bed arranged to be swung down to a horizontal position; a false floor over the bed in spaced relation thereto and supported from said sides, a drawer for supplies substantially the size of the bed slidably mounted between the floor and bed for fore and aft movement relative thereto and arranged to be pulled out to a predetermined position when the tailgate is swung down; the drawer being formed with a vertical foot-receiving recess in one side and extending from top to bottom thereof and disposed so as to be over the tailgate when the drawer is in said predetermined position.

3. In combination in a pick-up truck which includes a bed having upstanding sides, a false floor over the bed in spaced relation thereto and supported from said sides, a commissary drawer substantially the size of the bed and of a height to fit between the bed and false floor, means mounting the drawer in connection with the bed for fore and aft sliding movement relative to the bed whereby said drawer may be selectively disposed in a retracted position between the floor and bed or a rearwardly extended and exposed position relative thereto, and a supporting upright depending from the floor intermediate the ends and sides thereof; the drawer being formed with a vertical longitudinal slot open to the forward end thereof to straddle the upright and of a length sufficient to enable the drawer to be fully retracted without contacting the upright.

References Cited in the file of this patent

UNITED STATES PATENTS

| | | |
|---|---|---|
| 1,562,371 | Shanks | Nov. 17, 1925 |
| 2,329,419 | Reed | Sept. 14, 1943 |
| 2,643,395 | Stassinos | June 30, 1953 |
| 2,712,470 | Cardini | July 5, 1955 |